Reissued Jan. 22, 1924. Re. 15,751

UNITED STATES PATENT OFFICE.

HENRY HARRIS, OF LONDON, ENGLAND.

DEZINCING LEAD.

No Drawing. Original No. 1,395,820, dated November 1, 1921, Serial No. 354,851, filed January 29, 1920.
Application for reissue filed September 27, 1923. Serial No. 665,236.

DIVISION B.

*To all whom it may concern:*

Be it known that I, HENRY HARRIS, a subject of the King of Great Britain, residing in London, England, have invented certain new and useful Improvements in Dezincing Lead, of which the following is a specification.

Several reagents have been suggested for dezincing lead, among them caustic soda; this reagent, however, is not particularly active and parts with sodium to the lead. A mixture of zinc chlorid and litharge is effective, but the litharge must be free from silver and therefore expensive and a considerable amount of the zinc chlorid volatilizes and is lost at the temperature of the molten lead. It has also been proposed to utilize a double salt of zinc chlorid with the litharge or with lead sulphide ore in a process where the quantity of litharge or lead sulphide ore used must be such that the amount of lead contained therein is at least chemically equivalent to the zinc in the metal to be purified; that is to say the lead contained in the litharge or sulphide ore must be in the ratio of about 207 parts of lead to each 65 parts of zinc contained in the lead to be purified. (See German Patent 241483.) This last process is also objectionable because of the expense of producing the necessary amount of litharge or sulphite ore free from silver and other impurities.

I have found that fused alkali chlorid will react with molten lead containing zinc to remove the latter from the lead. The temperature required, however, is so high that loss of lead occurs and alkali metal passes into the lead from which it cannot easily be eliminated.

One of the objects of my invention is to avoid these objections by using in conjunction with the alkali chlorid a substance or substances which reduce its melting point. Preferably the melting point of the reagent thus formed should not exceed 500° C. A further object is to provide an efficient and inexpensive process utilizing such a mixture.

I have also found that at temperatures not exceeding 500° C., molten lead containing zinc can be oxidized by atmospheric oxygen to such an extent as to render unnecessary the addition of other oxygen (or a source of oxygen) for the dezincing.

With these objects in view my invention in one aspect comprises as the reagent the use of a mixture of alkali chlorid with another compound or compounds of an alkali metal, which will reduce the melting point of the alkali chlorid, such for example, as caustic alkali, either with or without an addition of oxygen (or a source of oxygen) other than that derived from atmospheric oxidization, and also comprises the conducting of the dezincing at the reduced temperature, preferably below that where any appreciable amount of alkali metal passes permanently into the lead.

A mixture of caustic alkali and alkali chlorid is particularly useful since the mixture does not part with sodium to the lead at the temperature at which it can be used, and the reaction which removes the zinc is not dependent on oxygen other than that contained in the mixture due, I believe, to the capacity of the mixture to absorb oxygen when said mixture and molten lead are mixed although oxygen added in the form of relatively small quantities of lithrage or forced air may hasten the process.

In another aspect my invention comprises, with the maintaining of the relatively low temperature, the use of zinc chlorid and alkali chlorid as the reagent, with or without an addition of oxygen (or a source of oxygen) other than that derived from atmospheric oxidization; but in the case of an added source of oxygen this phase of my invention does not contemplate or include a process where the oxygen source is lead oxide or an ore of lead oxide, used in such quantity that the contained lead is in amount chemically equivalent to the zinc in the metal to be purified; that is to say where a process is carried out depending upon this relatively large amount of lead oxide in conjunction with the zinc chlorid and sodium chlorid for the dezincing operation, as that process is known. This second aspect of my invention, does, however, not exclude the use of relatively small amounts of lead oxide such as one may have on hand or may desire to reduce to metallic lead and which may be regarded as incidental to but not necessary for the carrying out of my dezincing process.

As in the case of the caustic alkali in the first aspect of the invention, zinc chlorid in this case also lowers the melting point of the alkali chlorid, although it is not as effective or desirable as the caustic alkali; but its effectiveness may be improved when the addition of oxygen (or a source of oxygen) is not objectionable.

In this case the mixture is more effective than the known reagent consisting of zinc chlorid and litharge alone and less costly in zinc chlorid since the latter does not volatilize so readily when used in conjunction with alkali chlorid. This phase of my invention is also more effective than the known process utilizing a mixture of litharge, zinc chlorid and sodium chlorid and requiring litharge in such quantities as to contain lead in an amount at least chemically equivalent to the zinc in the metal to be purified.

I will further describe my invention by giving certain examples of the manner in which it may be practiced, and the invention will thereafter be more particularly pointed out in the appended claims.

The following examples illustrate the invention:—

(1) A mixture of 24 lbs. of sodium chlorid and 25.5 lbs. of caustic soda is brought into intimate contact (such as by the method described in my application for U. S. patent Serial No. 354,852) with 4 tons of lead containing 0.65 per cent of zinc, heated to about 500° C. The zinc is chloridized and oxidized and is found as a scum or dross mixed with the reagent.

(2) The lead to be dezinced is brought into intimate contact at a temperature about 500° C., with the double chlorid of zinc and sodium amounting to 3.6 times the weight of the zinc contained in the lead. Air is either blown through the lead during the operation or supplied in the manner described in my said application for U. S. Patent Serial No. 354,852. The oxidized and chloridized zinc is removed as referred to in example 1. The reagent is not exhausted by a single treatment and may be used again.

In my co-pending re-issue application Sr. No. 665,235 I aim to cover that phase or specie of my invention wherein the alkali chlorid is used in conjunction with another compound or compounds of an alkali metal which will lower the melting point of the alkali chlorid, such, for example, as caustic alkali; while in this application I aim to cover such features of the invention as are not claimed in said co-pending application; this application covering, among other features, that specie of my invention wherein alkali chlorid is used in conjunction with the zinc chlorid.

Having thus described the nature of the said invention and the best means I know of carrying the same into practical effect, I claim:—

1. Process of dezincing lead which comprises bringing the molten lead into intimate contact with a mixture comprising alkali chlorid and a substance which lowers the melting point of the alkali chlorid so as not to exceed about 500° C., maintaining the mixture not to exceed said temperature and conducting the operation without the addition of lead oxide (or ore containing lead oxide) in such quantity that the contained lead is in amount chemically equivalent to the zinc in the metal to be purified.

2. Process of dezincing lead which comprises bringing the molten lead into intimate contact with a mixture comprising alkali chlorid and a substance which lowers the melting point of the alkali chlorid so as not to exceed about 500° C., maintaining the mixture not to exceed said temperature and conducting the operation without depending upon the addition of lead oxide for the dezincing reaction.

3. Process of dezincing lead which comprises bringing the molten lead into intimate contact with a mixture comprising an alkali chlorid and a substance which lowers the melting point of the alkali chlorid so as not to exceed about 500° C., maintaining the mixture not to exceed said temperature and conducting the operation in such manner as to effect atmospheric oxidization for the dezincing reaction, so as to be able to dispense partially or wholly with the addition of lead oxide (or ore containing lead oxide).

4. Process of dezincing lead which comprises bringing the molten lead into intimate contact with a mixture comprising alkali chlorid and zinc chlorid at a temperature not exceeding about 500° C., maintaining the mixture not to exceed said temperature and conducting the operation without the addition of lead oxide (or ore containing lead oxide) in such quantity that the contained lead is in amount chemically equivalent to the zinc in the metal to be purified.

5. Process of dezincing lead which comprises bringing the molten lead into intimate contact with a mixture comprising alkali chlorid and zinc chlorid at a temperature not exceeding about 500° C., maintaining the mixture not to exceed said temperature and conducting the operation in such manner as to effect atmospheric oxidization for the dezincing reaction, and without depending upon lead oxide (or ore containing lead oxide) for said reaction.

6. Process of dezincing lead which comprises bringing the molten lead into intimate contact with a molten mixture comprising sodium chlorid and at least a sufficient amount of a substance which will act to reduce the melting point of the sodium chlorid to reduce the melting point of the mixture substantially below that of the sodium chlorid, maintaining the mixture substantially below the melting point of the sodium chlorid, and conducting the operation in such manner as to effect atmospheric oxidization for the dezincing reaction so as to be able to dispense partially or wholly with the addition of lead oxide (or ore containing lead oxide).

In testimony whereof I have signed my name to this specification.

HENRY HARRIS.